US012236846B2

(12) United States Patent
Cao et al.

(10) Patent No.: US 12,236,846 B2
(45) Date of Patent: Feb. 25, 2025

(54) DRIVE CIRCUIT OF DISPLAY PANEL FOR REGULATING VOLTAGE BASED ON WIRING VOLTAGE DROP AND METHOD FOR DRIVING THE SAME

(71) Applicants: BOE MLED Technology Co., Ltd., Beijing (CN); BOE Technology Group Co., Ltd., Beijing (CN)

(72) Inventors: Shicai Cao, Beijing (CN); Zhitao Zhang, Beijing (CN); Xiurong Wang, Beijing (CN); Tao Yang, Beijing (CN); Mengmeng Wang, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/920,347

(22) PCT Filed: Nov. 26, 2021

(86) PCT No.: PCT/CN2021/133499
§ 371 (c)(1),
(2) Date: Oct. 20, 2022

(87) PCT Pub. No.: WO2023/092453
PCT Pub. Date: Jun. 1, 2023

(65) Prior Publication Data

US 2024/0212579 A1 Jun. 27, 2024

(51) Int. Cl.
*G09G 3/32* (2016.01)
*G09G 3/34* (2006.01)

(52) U.S. Cl.
CPC ............. *G09G 3/32* (2013.01); *G09G 3/3426* (2013.01); *G09G 2300/0828* (2013.01); *G09G 2320/0276* (2013.01); *G09G 2330/021* (2013.01)

(58) Field of Classification Search
CPC ........................................................ G09G 3/32
(Continued)

(56) References Cited

U.S. PATENT DOCUMENTS

2014/0362124 A1 12/2014 Kim
2019/0325828 A1 10/2019 Zhang et al.
2021/0319749 A1* 10/2021 Ueno ........................ G09F 9/30

FOREIGN PATENT DOCUMENTS

CN 106782314 A 5/2017
CN 107068047 A 8/2017
(Continued)

*Primary Examiner* — Long D Pham
(74) *Attorney, Agent, or Firm* — IPro, PLLC

(57) ABSTRACT

Provided is a drive circuit including a power supply circuit, an adapter circuit board, and a voltage regulation circuit. The power supply circuit is coupled to the adapter circuit board and configured to transmit a power supply voltage to the adapter circuit board. The adapter circuit board is coupled to the plurality of light-emitting elements by wirings and configured to transmit the power supply voltage to each of the light-emitting elements. The voltage regulation circuit is coupled to the power supply circuit and configured to regulate, according to an ideal operating voltage corresponding to an operating current of each of the light-emitting elements under a target grayscale and a wiring voltage drop on the wiring coupled to each of the light-emitting elements, a magnitude of the power supply voltage output by the power supply circuit, in the case that the display panel displays a picture of the target grayscale.

18 Claims, 7 Drawing Sheets

(58) Field of Classification Search
USPC .......................................................... 345/55
See application file for complete search history.

(56) References Cited

FOREIGN PATENT DOCUMENTS

| | | | |
|---|---|---|---|
| CN | 109377960 | A | 2/2019 |
| CN | 109920372 | A | 6/2019 |
| CN | 110197640 | A | 9/2019 |
| CN | 110246453 | A | 9/2019 |
| CN | 111028784 | A | 4/2020 |

* cited by examiner

DRIVE CIRCUIT OF DISPLAY PANEL FOR REGULATING VOLTAGE BASED ON WIRING VOLTAGE DROP AND METHOD FOR DRIVING THE SAME

CROSS-REFERENCE TO RELATED APPLICATION

The present disclosure is a U.S. national stage of international application No. PCT/CN2021/133499, filed on Nov. 26, 2021, the content of which is herein incorporated by reference in its entirety.

TECHNICAL FIELD

The present disclosure relates to the field of display technologies, and in particular, relates to a drive circuit of a display panel, a method for driving the same, and a display device.

BACKGROUND

A mini light-emitting diode (Mini LED) is a semiconductor light-emitting diode that is capable of converting the electrical energy into the light energy. The Mini LED has advantages of high color saturation, high brightness, and energy saving, and may be used as a backlight or may directly display images as a light-emitting element. A display device using the Mini LED as a light-emitting element is also referred to as a mini LED direct display device.

SUMMARY

Embodiments of the present disclosure provide a drive circuit of a display panel, a method for driving the same, and a display device. The technical solutions are as follows.

In one aspect of the embodiments of the present disclosure, a drive circuit of a display panel is provided. The display panel includes: a plurality of light-emitting elements, and the drive circuit includes: a power supply circuit, an adapter circuit board, and a voltage regulation circuit; wherein the power supply circuit is coupled to the adapter circuit board, and the power supply circuit is configured to transmit a power supply voltage to the adapter circuit board:

the adapter circuit board is also coupled to the plurality of light-emitting elements by wirings, and the adapter circuit board is configured to transmit the power supply voltage to each of the light-emitting elements; and the voltage regulation circuit is coupled to the power supply circuit, and the voltage regulation circuit is configured to regulate, according to an ideal operating voltage corresponding to an operating current of each of the light-emitting elements under a target grayscale and a wiring voltage drop on the wiring coupled to each of the light-emitting elements, a magnitude of the power supply voltage output by the power supply circuit, in the case that the display panel displays a picture of the target grayscale.

In some embodiments, the voltage regulation circuit includes: a main control chip and a voltage regulation sub-circuit; wherein the main control chip is coupled to the voltage regulation sub-circuit, and the main control chip is configured to determine a target operating voltage of each of the light-emitting elements according to the ideal operating voltage corresponding to the operating current of each of the light-emitting elements under the target grayscale and the wiring voltage drop on the wiring coupled to each of the light-emitting elements, and transmit a feedback signal to the voltage regulation sub-circuit according to the target operating voltage of each of the light-emitting elements; and the voltage regulation sub-circuit is further coupled to the power supply circuit, and the voltage regulation sub-circuit is configured to regulate, according to the feedback signal, the magnitude of the power supply voltage output by the power supply circuit.

In some embodiments, the feedback signal is a digital signal; and the voltage regulation sub-circuit includes: a digital-to-analog converter and a voltage regulation module; wherein the digital-to-analog converter is coupled to the main control chip and the voltage regulation module, and the digital-to-analog converter is configured to convert the feedback signal to a voltage regulation signal, and transmit the voltage regulation signal to the voltage regulation module, the voltage regulation signal being an analog signal: and the voltage regulation module is coupled to the power supply circuit, and the voltage regulation module is configured to regulate, according to the voltage regulation signal, the magnitude of the power supply voltage output by the power supply circuit.

In some embodiments, the power supply circuit is provided with a feedback pin and an output pin; and the voltage regulation module includes: a first divider resistor, a second divider resistor, and a feedback resistor; wherein one terminal of the first divider resistor, one terminal of the second divider resistor, and one terminal of the feedback resistor are coupled to the feedback pin of the power supply circuit; and the other terminal of the first divider resistor is coupled to the output pin of the power supply circuit, the other terminal of the second divider resistor is grounded, and the other terminal of the feedback resistor is coupled to the digital-to-analog converter.

In some embodiments, the power supply voltage V_L0 output by the power supply circuit satisfies: $V\_L0=(1+r10/r20+1/rfb)*Vfb-Vdac0/rfb$:

wherein r10 represents a resistance value of the first divider resistor, r20 represents a resistance value of the second divider resistor, rib represents a resistance value of the feedback resistor. Vfb represents a voltage value of the feedback pin, and Vdac0 represents a voltage value of the voltage regulation signal.

In some embodiments, the main control chip is configured to:

determine a sum of the ideal operating voltage corresponding to the operating current of each of the light-emitting elements under the target grayscale and the wiring voltage drop on the wiring coupled to each of the light-emitting elements as the target operating voltage of each of the light-emitting elements, and transmit the feedback signal to the voltage regulation sub-circuit according to a maximum target operating voltage in the determined target operating voltages.

In some embodiments, the main control chip stores a volt-ampere characteristic curve corresponding to attribute information of each of the light-emitting elements, wherein the volt-ampere characteristic curve is configured to characterize, under the target grayscale, a mapping between the operating current of each of the light-emitting elements and the ideal operating voltage of each of the light-emitting elements; and the main control chip is further configured to;

acquire the attribute information of each of the light-emitting elements; and determine, according to the volt-ampere characteristic curve corresponding to the attribute information of each of the light-emitting elements and the operating current of each of the light-emitting elements under the target grayscale, the ideal operating voltage corresponding to the operating current of each of the light-emitting elements under the target grayscale.

In some embodiments, the main control chip further stores a Gamma table, wherein the Gamma table is configured to characterize a mapping between a display grayscale and the operating current, the display grayscale being a grayscale of a picture displayed by the display panel; and the main control chip is further configured to determine the operating current of each of the light-emitting elements under the target grayscale by a lookup from the Gamma table.

In some embodiments, the wirings include: a first signal wiring and a second signal wiring;

the adapter circuit board is coupled to a first electrode of each of the light-emitting elements in a bonding mode by the first signal wiring, and coupled to a second electrode of each of the light-emitting elements in the bonding mode by the second signal wiring; wherein the adapter circuit board is configured to transmit the power supply voltage to each of the light-emitting elements by the first signal wiring, and transmit a pull-down power supply signal to each of the light-emitting elements by the second signal wiring; and the main control chip is further configured to determine a sum of a first voltage drop on the first signal wiring coupled to each of the light-emitting elements and a second voltage drop on the second signal wiring coupled to each of the light-emitting elements as the wiring voltage drop on the wiring coupled to each of the light-emitting elements.

In some embodiments, the adapter circuit board includes: a first circuit board and a second board that are connected to each other in the bonding mode, wherein the first circuit board is coupled to the power supply circuit, and the second circuit board is coupled to the plurality of light-emitting elements by the wirings; and the main control chip is further configured to:

determine a first wiring resistance of the first signal wiring coupled to each of the light-emitting elements, a second wiring resistance of the second signal wiring coupled to each of the light-emitting elements, a bonding resistance, and a third wiring resistance of the second circuit board;

determine, according to the first wiring resistance, the bonding resistance, and the third wiring resistance, the first voltage drop on the first signal wiring coupled to each of the light-emitting elements; and determine, according to the second wiring resistance, the bonding resistance, and the third wiring resistance, the second voltage drop on the second signal wiring coupled to each of the light-emitting elements.

In some embodiments, the display panel includes n rows and m columns of light-emitting elements; wherein for the light-emitting element disposed in $i^{th}$ row and $j^{th}$ column, the first voltage drop V_IRdrop_V_ij satisfies:

$$V\_IRdrop\_V\_ij=\Sigma_{i=1}^{n}I\_ij*(r\_PCB\_Bonding+r\_FPC+r\_Bonding+r\_Fanout)+\Sigma_{i}^{n}[\Sigma_{i=1}^{i}I\_ij*ri];\text{ and}$$

for the light-emitting element disposed in the $i^{th}$ row and the $j^{th}$ column, the second voltage drop V_IRdrop_GND_ij satisfies:

$$V\_IRdrop\_GND\_ij=\Sigma_{i=1}^{n}I_{\_ij*}(r\_PCB\_Bonding'+r\_FPC'+r\_Bonding'+r\_Fanout')+\Sigma_{i}^{n}[\Sigma_{i=1}^{i}I\_ij*ri']:$$

wherein n, m, i, and j are integers greater than 0, i is less than or equal to n, j is less than or equal to m. $I_{\_ij}$ represents an operating current of the light-emitting elements disposed in the $i^{th}$ row and the $j^{th}$ column, r_PCB_Bonding represents a bonding resistance, on a bonding side of the first signal wiring, between the first circuit board and the second circuit board that are connected to each other in the bonding mode, r_PCB_Bonding' represents a bonding resistance, on a bonding side of the second signal wiring, between the first circuit board and the second circuit board that are connected to each other in the bonding mode, r_FPC represents a third wiring resistance in the second circuit board on the bonding side of the first signal wiring, r_FPC' represents a third wiring resistance in the second circuit board on the bonding side of the second signal wiring, r_Bonding represents a bonding resistance between the second circuit board and the first signal wiring that are connected to each other in the bonding mode, r_Bonding' represents a bonding resistance between the second circuit board and the second signal wiring that are connected to each other in the bonding mode, r_Fanout represents a fan-out resistance of a fan-out portion of the first signal wiring, r_Fanout' represents a fan-out resistance of a fan-out portion of the second signal wiring, ri represents the first wiring resistance of the first signal wiring, and ri' represents the second wiring resistance of the second signal wiring.

In some embodiments, the main control chip is a micro controller unit (MCU).

In some embodiments, the power supply circuit is a direct-current to direct-current (DC-DC) power supply circuit.

In some embodiments, the light-emitting element is a mini light-emitting diode (Mini LED).

In another aspect of the embodiments of the present disclosure, a method for driving a display panel is provided. The method is applicable to a voltage regulation circuit included in the drive circuit as described above. The method includes:

determining an ideal operating voltage of each of light-emitting elements according to an operating current of each of the light-emitting elements under a target grayscale, in the case that the display panel displays a picture of the target grayscale;

determining a wiring voltage drop on a wiring coupled to each of the light-emitting elements; and regulating, according to the ideal operating voltage of each of the light-emitting elements and the Hiring voltage drop on the wiring coupled to each of the light-emitting elements, a magnitude of a power supply voltage output by a power supply circuit included in the drive circuit.

In still another aspect of the embodiments of the present disclosure, a display device is provided. The display device includes: a display panel and a drive circuit as described above, wherein the display panel includes a plurality of light-emitting elements;

wherein the drive circuit is coupled to the plurality of light-emitting elements in the display panel, and configured to transmit a power supply voltage to each of the light-emitting elements.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure is described in further detail with reference to the enclosed drawings, to clearly present the objects, technical solutions, and advantages of the present disclosure.

The terms used in the detailed description of the present disclosure are merely for interpreting, instead of limiting, the embodiments of the present disclosure. It should be noted that unless otherwise defined, technical or scientific terms used in the embodiments of the present disclosure shall have ordinary meanings understandable by persons of ordinary skill in the art to which the disclosure belongs. The terms "first," "second," and the like used in the embodiments of the present disclosure are not intended to indicate any order, quantity or importance, but are merely used to distinguish the different components. The terms "comprise," "include," and derivatives or variations thereof are used to indicate that the element or object preceding the terms covers the element or object following the terms and its equivalents, and shall not be understood as excluding other elements or objects. The terms "connect," "contact," and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly. The terms "connected to," or "coupled to," are used to indicate an electrical connection.

In some practices, the Mini LED direct display device is generally driven by an active matrix (AM) driving mode. The Mini LED direct display device generally includes a power supply circuit and a display panel provided with a plurality of Mini LEDs. The power supply circuit is coupled to the plurality of Mini LEDs, and is configured to supply a voltage with a fixed magnitude for the Mini LEDs for driving the Mini LEDs to emit light.

However, in other way, the power consumption of the Mini LED direct display device is high and the product yield is poor.

Figure 1:
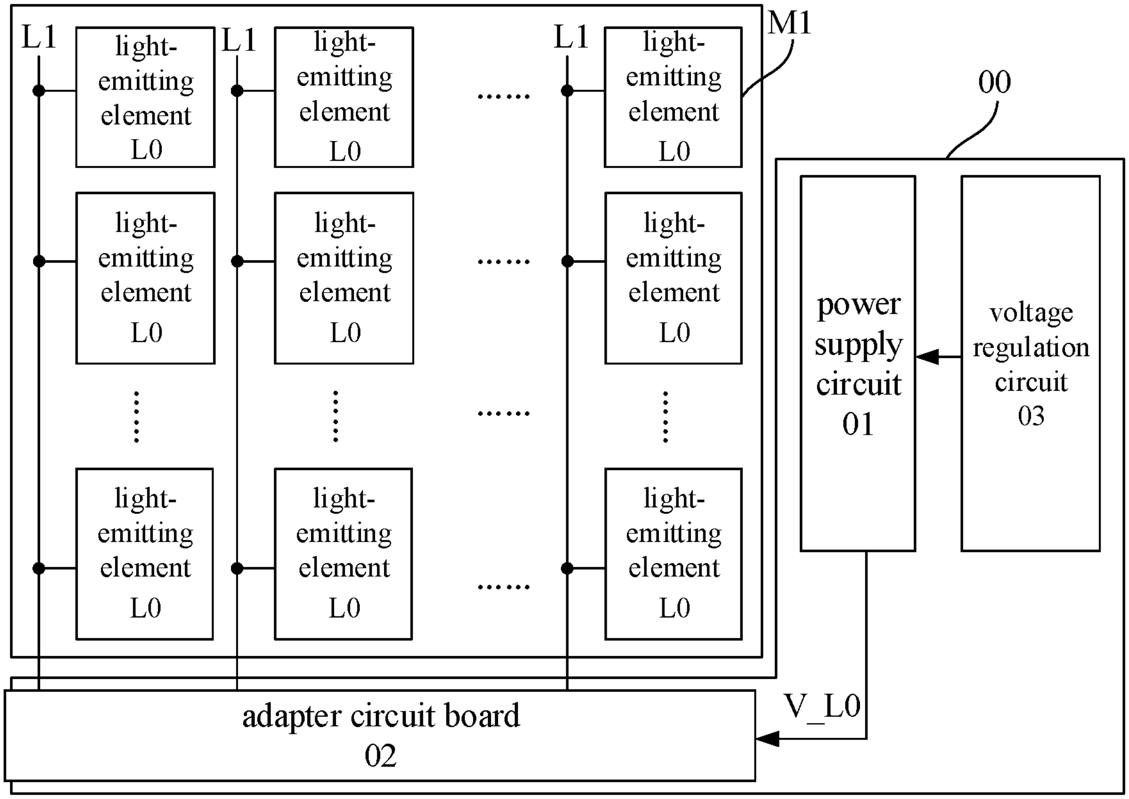
FIG. 1 is a schematic structural diagram of a drive circuit of a display panel according to some embodiments of the present disclosure.

FIG. 1 is a schematic structural diagram of a drive circuit of a display panel according to some embodiments of the present disclosure. Referring to FIG. 1, the display panel M1 includes a plurality of light-emitting elements L0. The drive circuit 00 includes: a power supply circuit 01, an adapter circuit board 02, and a voltage regulation circuit 03.

The power supply circuit 01 is coupled to the adapter circuit board 02. The power supply circuit 01 is configured to transmit a power supply voltage V_L0 to the adapter circuit board 02.

The adapter circuit board 02 is also coupled to the plurality of light-emitting elements L0 by wirings L1. The adapter circuit board 02 is configured to transmit the power supply voltage V_L0 to each of the light-emitting elements L0. That is, the adapter circuit board 02 is used as a circuit board for switching signals to indirectly transmit the power supply voltage V_L0 supplied by the power supply circuit 01 to the light-emitting elements L0.

For example, referring to FIG. 1, the plurality of light-emitting elements L0 included in the display panel M1 are arranged in an array, that is, are arranged in rows and columns. The light-emitting elements L0 disposed in a same column are coupled to the adapter circuit board 02 by one of the wirings L1. The light-emitting elements L0 disposed in different columns are coupled to the adapter circuit board 02 by different wirings L1.

The voltage regulation circuit 03 is coupled to the power supply circuit 01. The voltage regulation circuit 03 is configured to dynamically regulate, according to an ideal operating voltage V_LED corresponding to an operating current of each of the light-emitting elements L0 under a target grayscale and a wiring voltage drop V_IR drop on the wiring L1 coupled to each of the light-emitting elements, a magnitude of the power supply voltage V_L0 output by the power supply circuit 01. That is, the voltage regulation circuit 03 is capable of controlling, according to a display grayscale (e.g., the target grayscale) of a picture currently displayed by the display panel M1, the magnitude of the power supply voltage V_L0 supplied by the power supply circuit 01 for the light-emitting elements L0.

For example, in a case that the target grayscale is small, that is, the display panel M1 is in a low-grayscale display state, the power supply voltage V_L0 output by the power supply circuit 01 is regulated to be small by the voltage regulation circuit 02, such that the operating power consumption of the display panel is reduced. In a case that the target grayscale is large, that is, the display panel M1 is in a high-grayscale display state, the power supply voltage V_L0 output by the power supply circuit 01 is regulated to be large by the voltage regulation circuit 02, such that a display of the display panel M1 is reliable. In this way, compared with the power supply voltage V_L0 supplied by the power supply circuit 01 that is not regulable in the device known to the inventors, the operating power consumption is effectively reduced on the premise of ensuring a normal display of the display panel M1.

In summary, the present disclosure provides a drive circuit of a display panel. The drive circuit includes: the power supply circuit, the adapter circuit board, and the voltage regulation circuit. The adapter circuit board transmits the power supply voltage supplied by the power supply circuit to the light-emitting elements in the display panel. The voltage regulation circuit regulates, based on the ideal operating voltage of the light-emitting element under a certain grayscale and the wiring voltage drop on the wiring coupled to the light-emitting element, the power supply voltage supplied by the power supply circuit. That is, the voltage regulation circuit flexibly regulates, based on the grayscale of the screen displayed by the display panel, the power supply voltage supplied by the power supply circuit to the light-emitting element. In this way, the operating power consumption of the display panel is effectively reduced, and the product yield is further improved.

Figure 2:
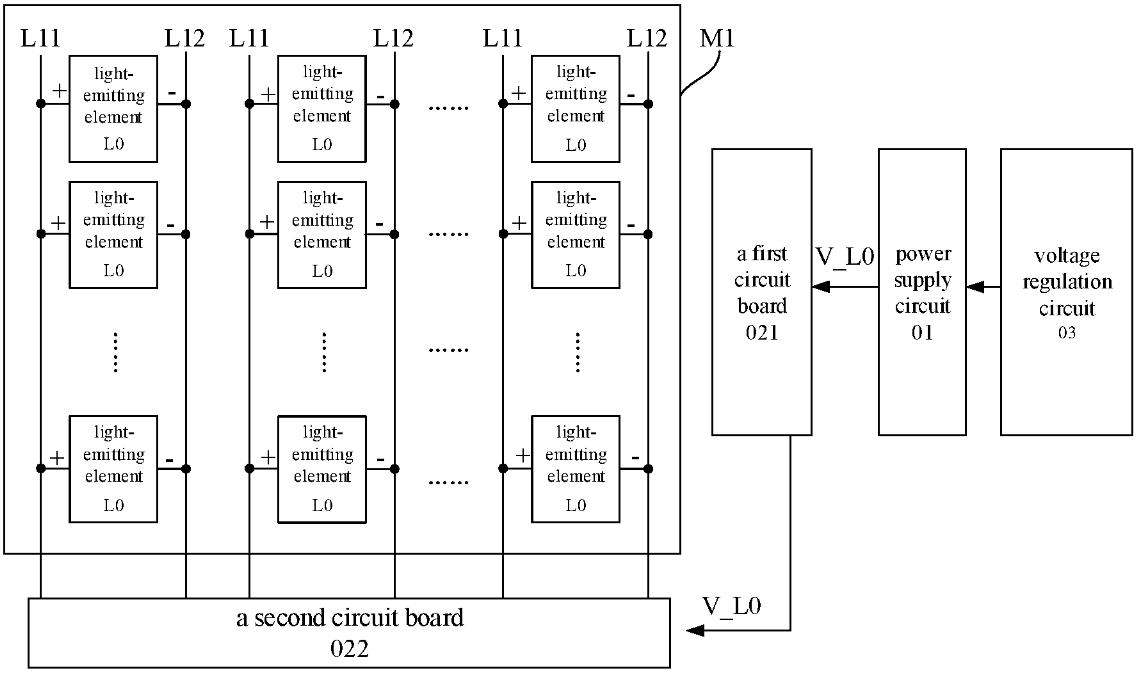
FIG. 2 is a schematic structural diagram of a drive circuit of another display panel according to some embodiments of the present disclosure.

FIG. 2 is a schematic structural diagram of a drive circuit of another display panel according to some embodiments of the present disclosure. Referring to FIG. 2, the adapter circuit board 02 according to some embodiments of the present disclosure includes: a first circuit board 021 and a second circuit board 022 that are connected to each other in a bonding mode. The first circuit board 021 is coupled to the power circuit 01, and the second circuit board 022 is coupled to the plurality of light-emitting elements L0 in the bonding mode by the wiring L1.

Still referring to FIG. 2, in the embodiments of the present disclosure, each of the light-emitting elements L0 is provided with a first electrode and a second electrode. In the first electrode and the second electrode, one is a positive electrode (+), and the other is a negative electrode (−). The embodiments of the present disclosure give description using a scenario where the first electrode is the positive electrode and the second electrode is the negative electrode as an example. The wirings L1 coupled to the light-emitting element L0 include: a first signal wiring L11 and a second signal wiring L12.

The adapter circuit board 02 is coupled to the first electrode of each of the light-emitting elements L0 in the bonding mode by the first signal wiring L11, and is coupled to the second electrode of each of the light-emitting elements L0 in the bonding mode by the second signal wiring L12. The adapter circuit board 02 is configured to transmit the power supply voltage V_L0 to each of the light-emitting elements L0 by the first signal wiring L11, and is configured to transmit a pull-down power supply signal to each of the light-emitting elements by the second signal wiring L12.

In this case, in some embodiments, the second circuit board 022 included in the adapter circuit board 02 is coupled to the light-emitting element L0 by the first signal wiring L11 and the second signal wiring L12. Accordingly, in some embodiments, the power supply circuit 01 transmits the generated power supply voltage V_L0 from the first circuit board 021 to the second circuit board 022, and then the second circuit board 022 transmits the generated power supply voltage V_L0 to each of the light-emitting elements L0 by the first signal wiring L11. Moreover, in some embodiments, the second circuit board 022 transmits the pull-down power supply signal to each of the light-emitting elements L0 by the second signal wiring L12;

Optionally, a voltage of the pull-down power supply signal is a fixed voltage, such as a signal supplied by a ground terminal GND. In other words, each of the light-emitting elements L0 is grounded by the second signal wiring L12, and the ground terminal GND is one of the terminals in the second circuit board 022. The embodiments below of the present disclosure give description using a scenario where each of the light-emitting elements L0 is grounded by the second signal wiring L12 as an example.

On the basis of the above embodiments, in some embodiments of the present disclosure, the power supply voltage V_L0 supplied by the power supply circuit 01 is a voltage required to be transmitted to the first electrode of the light-emitting element L0. The voltage regulation circuit 03 determines, according to the ideal operating voltage corresponding to the operating current of each of the light-emitting elements L0 under the target grayscale and the wiring voltage drop V_IR drop on the wiring L1 coupled to each of the light-emitting elements L0, a target power supply voltage VLED required to be loaded to two electrodes (i.e., the first electrode and the second electrode) of the light-emitting element L0. That is, the voltage regulation circuit 03 determines a voltage difference between the two electrodes of the light-emitting element L0. Then, the voltage regulation circuit 03 acquires a voltage required to be loaded to the first electrode of the light-emitting element L0 by subtracting the predetermined fixed voltage transmitted to the light-emitting element L0 from the determined voltage difference, and regulates, according to the determined voltage, the magnitude of the power supply voltage V_L0 output by the power supply circuit 01. To be specific, in some embodiments, the voltage regulation circuit 03 controls the power supply circuit 01 to output the determined voltage required to be loaded to the first electrode of the light-emitting element L0. It should be noted that, for the signal supplied by the ground terminal GND, because a voltage of the signal is generally 0, the target power supply voltage VLED determined by the voltage regulation circuit 03 is also considered as the voltage required to be loaded to the first electrode of the light-emitting element L0. Accordingly, the voltage regulation circuit 03 controls the power supply circuit 01 to output the power supply voltage V_L0 of which the magnitude is equal to a magnitude of the target power supply voltage VLED. That is, the voltage regulation circuit 03 controls the power supply circuit 01 to supply the target power supply voltage VLED for the light-emitting element L0.

Figure 3:
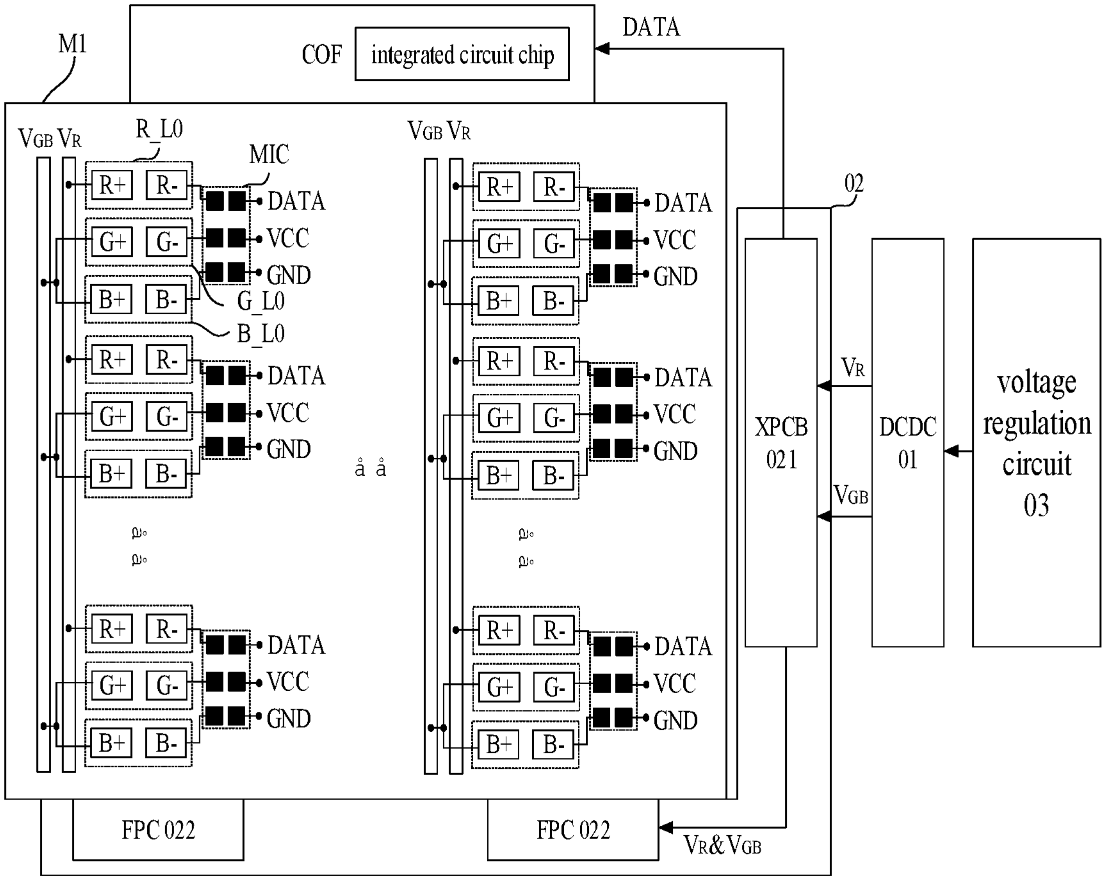
FIG. 3 is a schematic structural diagram of a drive circuit of still another display panel according to some embodiments of the present disclosure.

FIG. 3 is a schematic structural diagram of a drive circuit of still another display panel according to some embodiments of the present disclosure. Referring to FIG. 3, the power supply circuit 01 according to some embodiments of the present disclosure is a direct-current to direct-current (DC-DC) power supply circuit 01. The first circuit board 021 is a printed circuit board (PCB) of which the identification is XPCB in figures. The second circuit board 022 is a flexible printed circuit (FPC). The light-emitting element L0 is a mini light-emitting diode (Mini LED).

Optionally, the plurality of light-emitting elements L0 included in the display panel M1 is divided into a plurality of red (R) light-emitting elements R_L0, a plurality of green (G) light-emitting elements G_L0, and a plurality of blue (B) light-emitting elements B_L0 according to colors. Referring to FIG. 3, in a column direction, the red light-emitting elements R_L0, the green light-emitting elements G_L0, and the blue light-emitting elements B_L0 are successively arranged. In addition, positive electrodes and negative electrodes of the light-emitting elements L0 are identified in FIG. 3. For example, the red light-emitting element R_L0 has a positive electrode R+ and a negative electrode R−, the green light-emitting element G_L0 has a positive electrode G+ and a negative electrode G−, and the blue light-emitting element B_L0 has a positive electrode B+ and a negative electrode B−. In other embodiments, the display panel M1 includes light-emitting elements of other colors, such as white light-emitting elements. In some embodiments, the red light-emitting elements R_L0, the green light-emitting elements G_L0, and the blue light-emitting elements B_L0 are arranged in other way.

In the field of the Mini LED display, a difference between the power supply voltages V_L0 required to be supplied to the blue light-emitting element B_L0 and the green light-emitting element G_L0 is small. Therefore, referring to FIG. 3, the red light-emitting elements R_L0 disposed in a same column are coupled to a same first signal wiring L11, and the green light-emitting elements G_L0 disposed in a same column are coupled to a same first signal wiring L11. The power supply circuit 01 supplies a power supply voltage VR to each of the red light-emitting elements R_L0, and supplies a same power supply voltage VGB to the blue light-emitting elements B_L0 and the green light-emitting elements G_L0. It should be noted that, neither the second signal wiring L12 nor a coupling between the first signal wiring L11 and the second circuit board 022 is not shown in FIG. 3.

Optionally, taking it into account that the current display panel M1 has a large size and a high resolution, the drive circuit generally includes a plurality of FPCs 011, and each of the FPCs 022 is coupled to the plurality of light-emitting elements L0 of the display panel M1, and the light-emitting elements L0 coupled to each of the FPCs 022 are different. The XPCB 022 is coupled to each of the FPCs 022. For example, referring to FIG. 3, two FPCs 022 are shown.

Moreover, the number of the wirings L11 coupled to each of the FPCs 022 is small by arranging the plurality of FPCs 022. That is, signals (e.g., the power supply voltage V_L0) are only transmitted to the small number of the plurality of light-emitting elements L0. In this way, the probability of signal crosstalk is lowered, and the reliability of signal transmission is improved. In addition, the number of the wirings L1 coupled to each of the FPCs 022 is small. Therefore, a length of each of the wirings L1 is correspondingly arranged to be short, and thus a difference between the wiring voltage drops V_IR drops on the wirings coupled to different light-emitting elements L0 is prevented from becoming greater.

In addition, referring to FIG. 3, in some embodiments, the drive circuit of the display panel further includes: an integrated circuit chip (IC) and a plurality of micro integrated circuit chips (MIC). Optionally, the integrated circuit chip is packaged by a chip on film (COF).

The integrated circuit chip is coupled to the plurality of MICs, and each of the MICs is coupled to at least one of the light-emitting elements L0 by a pin to form signal loop with the at least one of the light-emitting elements L0. The integrated circuit chip provides a data signal DATA by each of the MICs to the corresponding light-emitting elements L0 to drive the light-emitting element L0 to display a corresponding grayscale brightness. The data signal DATA is from the first circuit board 021, and the first circuit board 021 receives the data signal DATA from a timing controller (not shown in FIG. 3) to which the first circuit board 021 is coupled. In addition, the negative electrode of each of the light-emitting elements L0 is coupled to a VCC power supply terminal by the pin to receive a power supply signal provided by the VCC power supply terminal. The black filled blocks in FIG. 3 represent the pins.

Figure 4:
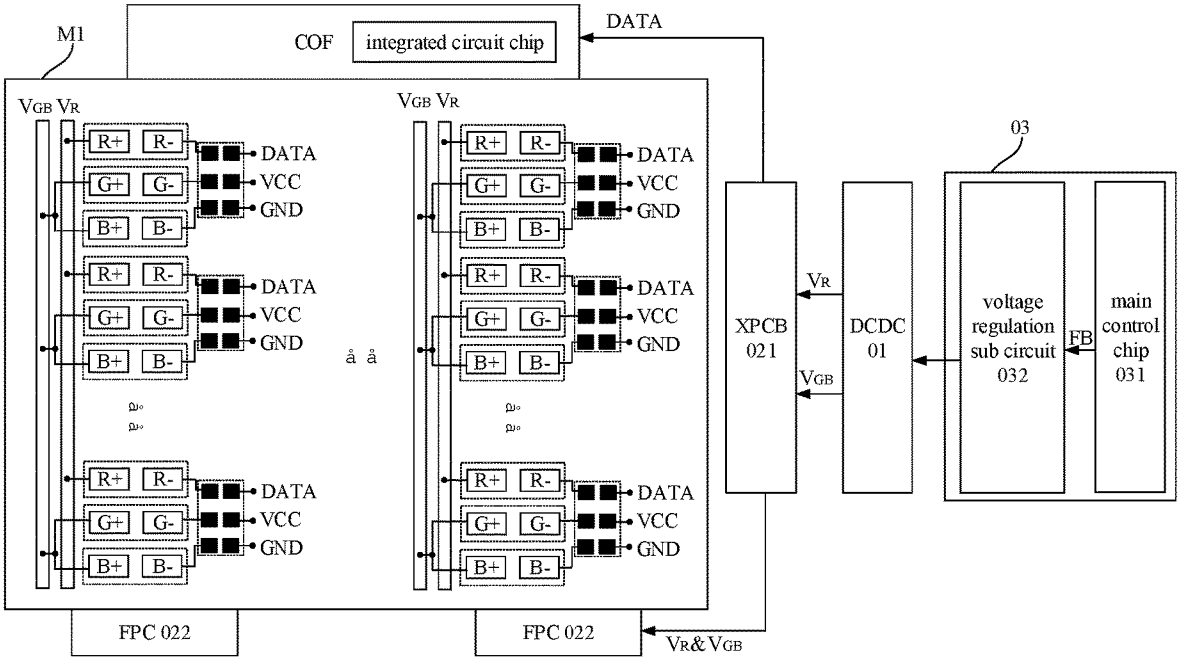
FIG. 4 is a schematic structural diagram of a drive circuit of yet still another display panel according to some embodiments of the present disclosure.

FIG. 4 is a schematic structural diagram of a drive circuit of yet still another display panel according to some embodiments of the present disclosure. Referring to FIG. 4, the voltage regulation circuit 03 includes: a main control chip 031 and a voltage regulation sub-circuit 032. The main control chip 031 is a microcontroller unit (MCU).

The main control chip 031 coupled to the voltage regulation sub-circuit 032. The main control chip 031 is configured to determine, according to the ideal operating voltage V_LED corresponding to the operating current of each of the light-emitting elements L0 under the target grayscale and the wiring voltage drop V_IR drop on the wiring L1 coupled to each of the light-emitting elements L0, the target operating voltage VLED of each of the light-emitting elements L0, and is configured to transmit a feedback signal FB to the voltage regulation sub-circuit 032 according to the target operating voltage VLED of each of the light-emitting elements L0.

The voltage regulation sub-circuit 032 is coupled to the power supply circuit 01. The voltage regulation sub-circuit 032 is configured to regulate, according to the received feedback signal FB, the magnitude of the power supply voltage V_L0 output by the power supply circuit 01. For example, the magnitude of the power supply voltage V_L0 is regulated to be consistent with the magnitude of the target operating voltage VLED.

Optionally, in the embodiments of the present disclosure, the main control chip 031 stores a Gamma table and a volt-ampere characteristic curve corresponding to attribute information of each of the light-emitting elements L0. The Gamma table is configured to characterize a mapping between a display grayscale and the operating current, wherein the display grayscale is a grayscale of a picture required to be displayed by the display panel M1. The volt-ampere characteristic curve is configured to characterize a mapping, under the target grayscale, between the operating current of each of the light-emitting elements L0 and the ideal corking voltage V_LED of each of the light-emitting elements L0. In addition, for each of the light-emitting elements L0, the attribute information of the light-emitting element L0 refers to information of the light-emitting element L0 upon classification of it according to a photoelectric characteristic of it when leaving the factory. Each class is referred to as a Bin class, wherein a Bin value corresponding to each Bin class includes the volt-ampere characteristic curve, and different Bin classes correspond to different volt-ampere characteristic curves.

On the basis of the above embodiments, in some embodiments, the main control chip 031 is configured to determine the operating current of each of the light-emitting elements L0 under the target grayscale by a lookup from the Gamma table first. Then, the main control chip 031 acquires the attribute information (i.e., the Bin class) of each of the light-emitting elements L0, and determine, according to the volt-ampere characteristic curve corresponding to the attribute information of each of the light-emitting elements L0 and the operating current of each of the light-emitting elements L0 under the target grayscale, the ideal operating voltage VLED corresponding to the operating current of each of the light-emitting elements L0 under the target grayscale.

Figure 5:
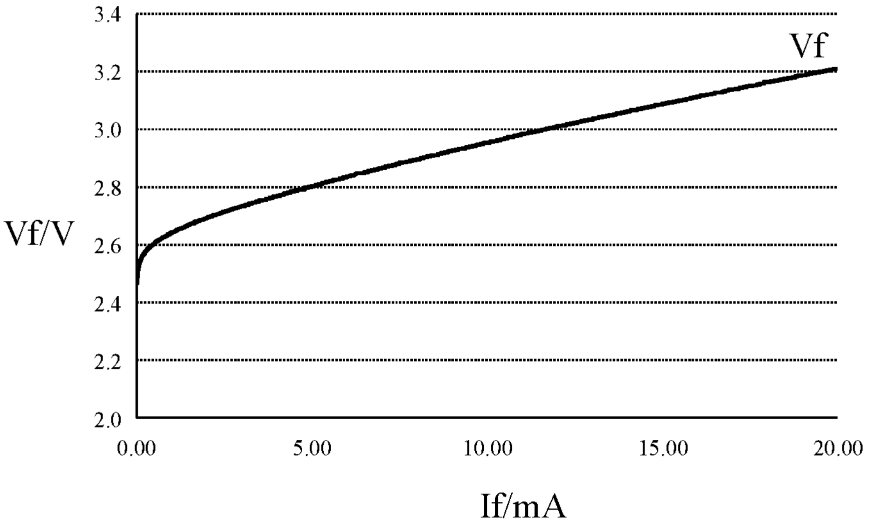
FIG. 5 is a schematic diagram of a volt-ampere characteristic curve according to some embodiments of the present disclosure.

Exemplarily, taking 7 Bin classes, Bin 1 to Bin 7, as an example, a representative voltage value of the volt-ampere characteristic curve corresponding to each Bin class is listed in Table 1. The representative voltage value is a maximum voltage value, a minimum voltage value, or an average voltage value of the volt-ampere characteristic curve corresponding to the Bin class. For example, a representative voltage value corresponding to Bin 1 is 2.6 volt (V). and a representative voltage value corresponding to Bin 2 is 2.65V. Due to the different representative values corresponding to different Bin classes, the volt-ampere characteristic curves corresponding to different Bin class are different. In addition, FIG. 5 is a schematic diagram of a volt-ampere characteristic curve according to some embodiments of the present disclosure. The abscissa represents the operating current IF of the light-emitting element L0, and the unit of the operating current is milliampere (mA). The ordinate represents the ideal operating voltage VLED corresponding to the operating current. If. The ideal operating voltage VLED is represented by Vf in FIG. 5, and the unit of the ideal operating voltage VLED is V.

TABLE 3

| | |
|---|---|
| Bin1 | 2.6 |
| Bin2 | 2.65 |
| Bin3 | 2.7 |
| Bin4 | 2.75 |
| Bin5 | 2.8 |
| Bin6 | 2.85 |
| Bin7 | 2.9 |

Exemplarily, assuming that the main control chip 031 finds in the Gamma table that the operating current of one of the light-emitting elements L0 under the current target grayscale is 15 mA, and acquires the volt-ampere characteristic curve shown in FIG. 5 corresponding to the Bin class of the light-emitting element L0, then the main control chip 031 determines the ideal operating voltage VLED of the light-emitting element L0 is about 3.1V based on the found operating current "15 mA" and the volt-ampere characteristic curve shown in FIG. 5.

In other embodiments, the Gamma table is stored in the integrated circuit chip, and the integrated circuit chip is coupled to the main control chip 031. Accordingly, the integrated circuit chip determines the operating current of each of the light-emitting elements L0 under the target scale by a lookup from the Gamma table, and transmits the operating current to the main control chip 031.

Optionally, referring to FIG. 2 to FIG. 4 together, the display panel M1 according to the embodiments of the present disclosure includes n rows and m columns of light-emitting elements L0. The main control chip 031 is configured to determine a sum of a first voltage drop on the first wiring L11 coupled to each of the light-emitting elements L0 and a second voltage drop on the second wiring L12 coupled to each of the light-emitting elements L0 as the wiring voltage drop on the wiring L1 coupled to each of the light-emitting elements L0.

Take a scenario where the second signal wiring is grounded GND as an example. That is, in the present disclosure, the wiring voltage drop V_IR drop ij on the wiring L1 coupled to the light-emitting element L0_ij disposed in $i^{th}$ row and $j^{th}$ column satisfies:

$$\text{V\_IRdrop\_ij} = \text{V\_IRdrop\_V\_ij} + \text{V\_IRdrop\_GND\_ij} \quad \text{formula (1)}$$

n, m, i, j are integers greater than 0, i is less than or equal to n, and j is less than or equal to m. V_IRdrop_V_ij represents the first voltage drop on the first wiring L11 coupled to the light-emitting element L0_ij; and V_IRdrop_GND_ij represents the second voltage drop on the second wiring L12 coupled to the light-emitting element L0_ij.

Optionally, referring to FIG. 2 to FIG. 4 together, in some embodiments, the second circuit board 022 includes a signal wiring. The main control chip 031 according to some embodiments of the present disclosure extracts a predetermined first wiring resistance of the first signal wiring L11 coupled to each of the light-emitting elements L0, a predetermined second wiring resistance of the second signal wiring L12 coupled to each of the light-emitting elements L0, a predetermined bonding resistance (e.g., a bonding resistance between the first circuit board 021 and the second circuit board 022 that are connected to each other in the bonding mode), and a predetermined third wiring resistance of the second circuit board 022. Then, the main control chip 031 further determines, according to the first wiring resistance, the bonding resistance, and the third wiring resistance, the first voltage drop on the first signal wiring L11 coupled to each of the light-emitting elements L0, and further determines, according to the second wiring resistance, the bonding resistance, and the third wiring resistance, the second voltage drop on the second signal wiring L12 coupled to each of the light-emitting elements L0.

For the light-emitting element L0_ij disposed in the $i^{th}$ row and the $j^{th}$ column, the first voltage drop V_IRdrop_V_ij satisfies:

$$\text{V\_IRdrop\_V\_ij} = \sum_{i=1}^{n} \text{I\_ij} * (\text{r\_PCB\_Bonding} + \text{r\_FPC} + \text{r\_Bonding} + \text{r\_Fanout}) + \sum_{i}^{n}\left[\sum_{i=1}^{i} \text{I\_ij} * ri\right]; \quad \text{formula (2)}$$

For the light-emitting element L0_ij disposed in the $i^{th}$ row and the $j^{th}$ column, the second voltage drop V_IRdrop_GND_ij satisfies:

$$\text{V\_IRdrop\_GND\_ij} = \sum_{i=1}^{n} I_{-ij} * (\text{r\_PCB\_Bonding}' + \text{r\_FPC}' + \text{r\_Bonding}' + \text{r\_Fanout}') + \sum_{i}^{n}\left[\sum_{i=1}^{i} \text{I\_ij} * ri'\right]; \quad \text{formula (3)}$$

Figure 6:
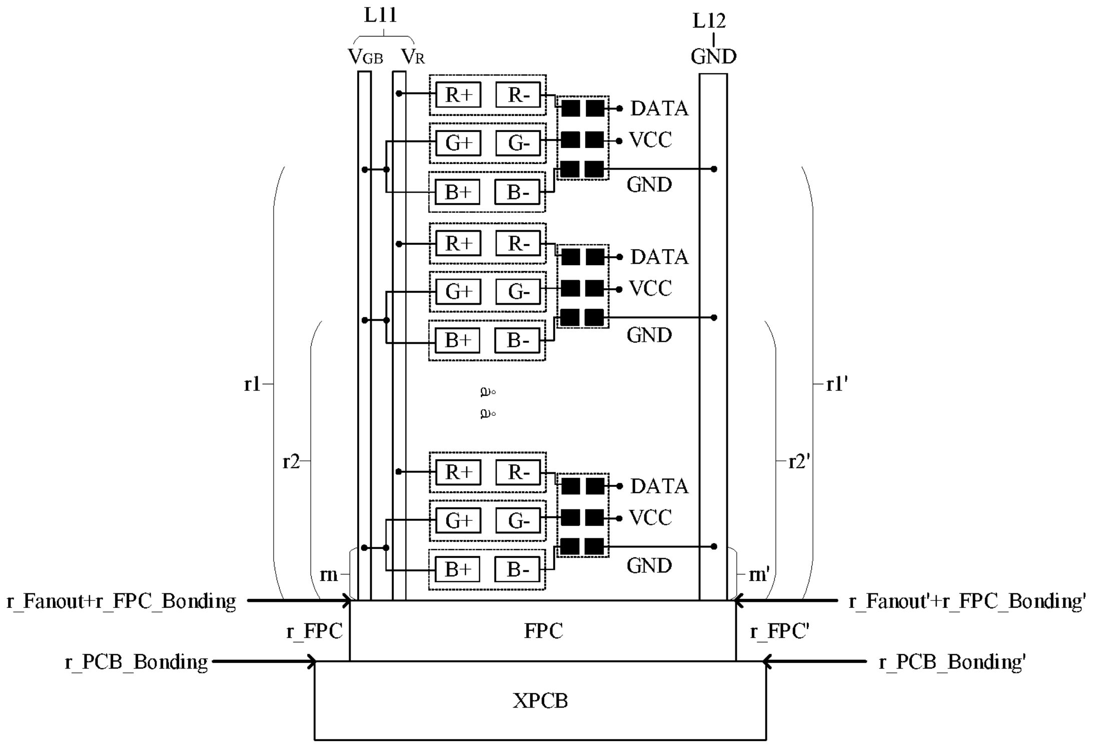
FIG. 6 is a resistance equivalent schematic diagram according to some embodiments of the present disclosure.

I_ij represents the operating current of the light-emitting element L0 disposed in the $i^{th}$ row and the $j^{th}$ column. Referring to a resistance equivalent schematic diagram shown in FIG. 6, r_PCB_Bonding represents a bonding resistance, on a bonding side of the first signal wiring L11 (i.e., a side of the first signal wiring L11 coupled to the second circuit board), between the first circuit board (i.e., XPCB) and the second circuit board (i.e., FPC) that are connected to each other in the bonding mode. r_PCB_Bonding' represents a bonding resistance, on a bonding side of the second signal wiring L12 (i.e., a side of the second signal wiring L12 coupled to the second circuit board), between the XPCB and the FPC that are connected to each other in the bonding mode. r_FPC represents a third wiring resistance in the FPC on the bonding side of the first signal wiring L11. r_FPC' represents a third wiring resistance in the FPC on the bonding side of the second signal wiring L12. r_Bonding represents a bonding resistance between the FPC and the first signal wiring L11 that are connected to each other in the bonding mode. r_Bonding' represents a bonding resistance between the FPC and the second signal wiring L12 that are connected to each other in the bonding mode. r_Fanout represents a fan-out resistance of a fan-out portion of the first signal wiring L11. r_Fanout' represents a fan-out resistance of a fan-out portion of the second signal wiring L12. ri represents the first wiring resistance of the first signal wiring L11. ri' represents the second wiring resistance of the second signal wiring L12. A fan-out portion generally refers to a portion that the signal wiring extends from the display region to the FPC.

In the case that the main control chip 031 determines the ideal operating voltage V_LED corresponding to the operating current of each of the light-emitting elements L0 under the target grayscale and the wiring voltage drop V_IR drop on the wiring L1 coupled to each of light-emitting elements L0, the main control chip 031 is further configured to determine a sum of the ideal operating voltage V_LED corresponding to the operating current of each of the light-emitting elements L0 under the target grayscale and the wiring voltage drop V_IR drop on the wiring L1 coupled to each of light-emitting elements L0 as the target operating voltage VLED of each of the light-emitting elements L0.

That is, the target operating voltage VLED of each of the light-emitting elements L0

$$VLED = V\_LED + V\_IRdrop; \qquad \text{formula (4)}$$

Then, the main control chip 031 extracts a maximum target operating voltage VLED_max of the whole display panel M1, and transmits the feedback signal FB to the voltage regulation sub-circuit 032 based on the maximum target operating voltage VLED_max. That is, the feedback signal FB is related to the maximum target operating voltage VLED_max.

Figure 7:
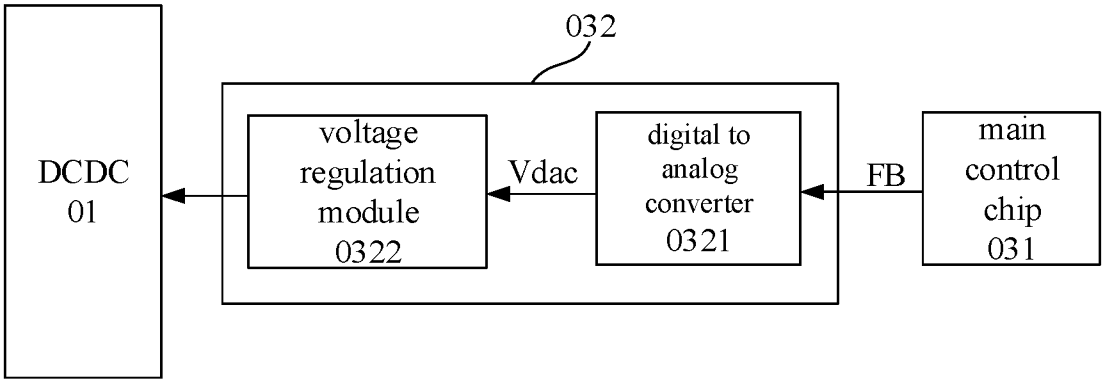
FIG. 7 is a partial schematic structural diagram of a drive circuit of a display panel according to some embodiments of the present disclosure.

Optionally, in some embodiments of the present disclosure, the feedback signal FB generated by the main control chip 031 is a digital signal. The power supply circuit 01 generally only processes an analog signal, and therefore, referring to FIG. 7, the voltage regulation sub-circuit 032 according to the embodiments of the present disclosure includes: a digital to analog converter (DAC) 0321 and a voltage regulation module 0322.

The digital to analog converter 0321 is coupled to the main control chip 031 and the voltage regulation module 0322. The digital to analog converter 0321 is configured to convert the feedback signal FB transmitted by the main control chip 031 to a voltage regulation signal Vdac, and is configured to transmit the voltage regulation signal Vdac to the voltage regulation module 0322.

On the basis of the operating principle of the DAC 0321, the voltage regulation signal Vdac converted by the digital to analog converter 0321 may be an analog signal. That is, the voltage regulation signal Vdac and the feedback signal FB have same magnitudes but different types. One is the digital signal, and the other is the analog signal.

In some embodiments, the voltage regulation module 0322 is also coupled to the power supply circuit (i.e., a DC-DC power supply circuit). The voltage regulation module 0322 is configured to regulate, according to the voltage regulation signal Vdac, the magnitude of the power supply voltage V_L0 output by the power supply circuit 01.

Optionally, referring to FIG. 8 again, the power supply circuit 01 according to the embodiments of the present disclosure includes a feedback pin Fb and an output pin Vout. The voltage regulation module 0322 includes: a first divider resistor R1, a second divider resistor R2, and a feedback resistor Rfb.

One terminal of the first divider resistor R1, one terminal of the second divider resistor R2, and one terminal of the feedback resistor Rfb are coupled to the feedback pin Fb of the power supply circuit 01. The other terminal of the first divider resistor R1 is coupled to the output pin Vout of the power supply circuit 01, the other terminal of the second divider resistor R2 is grounded, and the other terminal of the feedback resistor Rib is coupled to the digital to analog converter 0321.

On this basis, according to the Kirchhoff's current law, a current i of any node in a circuit satisfies: $\Sigma_{k=1}^{n} i_k = 0$. That is, a sum of a current flowing into the node and a current flowing out of the node is 0. In this way, take a scenario where the power supply voltage V_L0 is equal to the target power supply voltage VLED as an example. For a node P0 shown in FIG. 8, the node P0 satisfies:

$$\frac{VLED}{r10 + r20} = \frac{Vfb - Vdac0}{rfb} + \frac{Vfb}{r20}; \qquad \text{formula (5)}$$

By transforming the formula (5), the power supply voltage V_L0 output by the power supply circuit 01 according to some embodiments of the present disclosure satisfies:

$$V\_L0 = VLED = (1 + r10/r20 + 1/rfb) * Vfb - Vdac0/rfb; \qquad \text{formula (6)}$$

r10 represents a resistance value of the first divider resistor R1, r20 represents a resistance value of the second divider resistor R2, rib is a resistance value of the feedback resistor Rfb, Vfb represents a voltage value of the feedback pin Fb, and Vdac0 represents a voltage value of the voltage regulation signal Vdac. r10, r20, rfb, and Vfb all represent fixed values. In this way, it is determined that the power supply voltage V_L0 finally output by the power supply circuit 01 is controlled by the voltage regulation signal Vdac.

Figure 8:
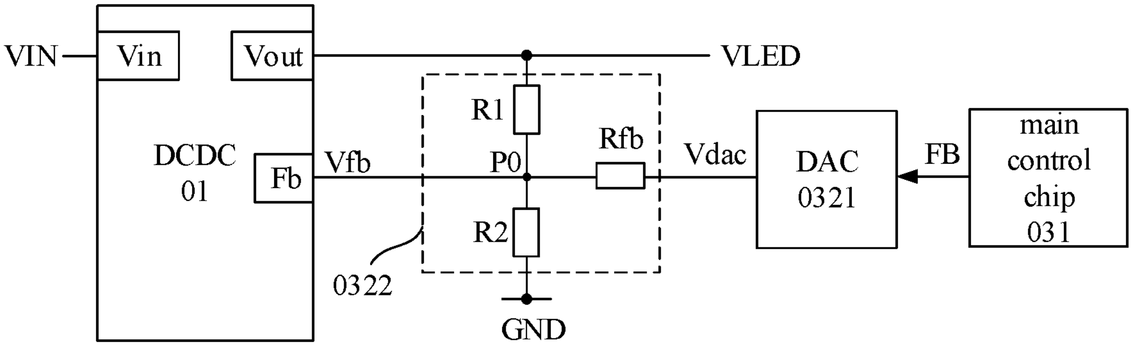
FIG. 8 is a partial schematic structural diagram of a drive circuit of another display panel according to some embodiments of the present disclosure.

In addition, referring to FIG. 8, the power supply circuit 01 includes an input pin Vin. The input pin Vin is externally connected to an input power supply terminal VIN, and works in response to a signal provided by the input power supply terminal VIN. For example, the input power supply terminal VIN is 220 V mains supply.

Optionally, taking into account that temperature affects luminous efficiency of the light-emitting element L0, as well as some characteristic information of the light-emitting element L0 (i.e., the volt-ampere characteristic curve), the main control chip 031 is configured to reserve a margin for the actually calculated target operating voltage VLED when determining the target operating voltage VLED, wherein the margin is set flexibly according to actual products.

Exemplarily, the main control chip 031 transmits the feedback signal FB to the voltage regulation sub-circuit 032 based on a difference between the actual determined target operating voltage VLED and the margin. In this case, the temperature refers to either the ambient temperature or the device temperature of the display panel M1. In this way, on the basis of lowering the power consumption, the luminous efficiency of the light-emitting elements L0 is great, and thus the display effect of the display panel M1 is great.

In summary, the embodiments of the present disclosure provide a drive circuit of a display panel. The drive circuit includes: the power supply circuit, the adapter circuit board, and the voltage regulation circuit. The adapter circuit board transmits the power supply voltage supplied by the power supply circuit to the light-emitting elements in the display panel. The voltage regulation circuit regulates, based on the ideal operating voltage of the light-emitting element under a certain grayscale and the wiring voltage drop on the wiring coupled to the light-emitting element, the power supply voltage supplied by the power supply circuit. That is, the voltage regulation circuit flexibly regulates, based on the grayscale of the screen displayed by the display panel, the power supply voltage supplied by the power supply circuit to the light-emitting element. In this way, the operating power consumption of the display panel is effectively reduced, and the product yield is further improved.

Figure 9:
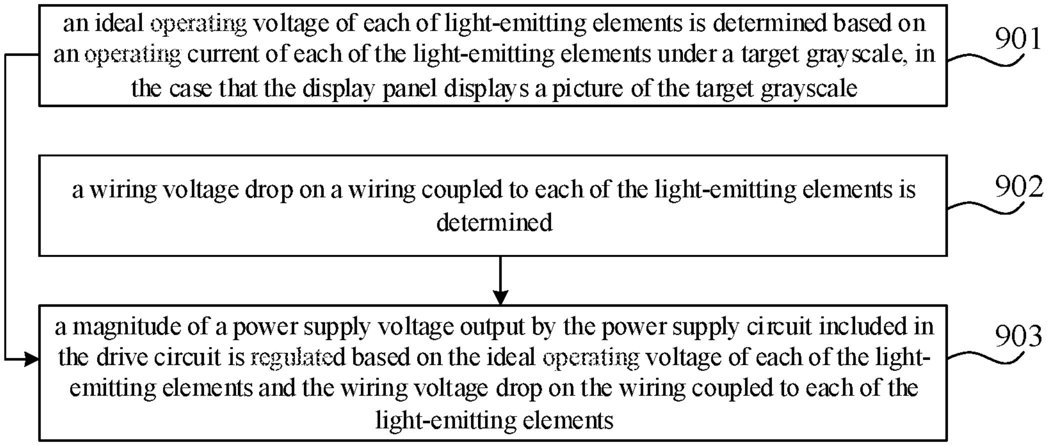
FIG. 9 is a flowchart of a method for driving a display panel according to some embodiments of the present disclosure.

FIG. 9 is a flowchart of a method for driving a display panel according to some embodiments of the present disclosure. The method is applied in a voltage regulation circuit included in a drive circuit shown in the above figure, wherein the drive circuit further includes a power supply circuit. Referring to FIG. 9, the method described in the embodiments of the present disclosure includes the following steps.

In step 901, an ideal operating voltage of each of light-emitting elements is determined based on an operating current of each of the light-emitting elements under a target grayscale, in the case that the display panel displays a picture of the target grayscale.

In step 902, a wiring voltage drop on a wiring coupled to each of the light-emitting elements is determined.

In step 903, a magnitude of a power supply voltage output by the power supply circuit included in the drive circuit is regulated based on the ideal operating voltage of each of the light-emitting elements and the wiring voltage drop on the wiring coupled to each of the light-emitting elements.

Optionally, referring to FIG. 4, the voltage regulation circuit 04 described in the embodiments of the present disclosure includes: a main control chip 031 and a voltage regulation sub-circuit 032. The main control chip 031 is coupled to the voltage regulation sub-circuit 032, and the voltage regulation sub-circuit 032 is coupled to the power supply circuit 01. The main control chip 031 stores a Gamma table and a volt-ampere characteristic curve corresponding to attribute information of each of the light-emitting elements L0. The Gamma table is configured to characterize a mapping between a display grayscale and an operating current. The display grayscale refers to a grayscale of a picture required to be displayed by the display panel M1. The volt-ampere characteristic curve is configured to characterize, under the target grayscale, a mapping between the ideal operating voltage V_LED of each of the light-emitting elements L0 and the operating current of each of the light-emitting elements L0. On the basis, step 901 includes the following operations.

The operating current of each of the light-emitting elements under the target grayscale is determined by a lookup from the Gamma table by the main control chip 031. Moreover, the attribute information of each of the light-emitting elements L0 is acquired, and the ideal operating voltage corresponding to the operating current of each of the light-emitting elements under the target grayscale is determined based on the volt-ampere characteristic curve corresponding to the attribute information of each of the light-emitting elements L0 and the operating current of each of the light-emitting elements L0 under the target grayscale. For detailed steps of determining the ideal operating voltage, reference may be made to the device embodiments described above, which are not repeated herein.

Optionally, referring to FIG. 2 to FIG. 4, the drive circuit further includes an adapter circuit board 02. The adapter circuit board 02 includes a first circuit board 021 and a second circuit board 022 that are connected to each other in a bonding mode. The wiring L1 includes a first signal wiring L11 and a second signal wiring L12. The second circuit board 022 is coupled to a first electrode of each of the light-emitting elements L0 in the bonding mode by the first signal wiring L11, and is coupled to a second electrode of each of the light-emitting elements L0 by the second signal wiring L12. On this basis, step 902 includes the followings.

A sum of a first voltage drop on the first signal wiring L11 coupled to each of the light-emitting elements L0 and a second voltage drop on the second signal wiring L12 coupled to each of the light-emitting elements L0 is determined by the main control chip 031 as the wiring voltage drop on the wiring coupled to each of the light-emitting elements L0. For detailed steps of determining the wiring voltage drop, reference may be made to the device embodiments described above, which are not repeated herein.

In addition, step 903 includes the followings. The target operating voltage of each of the light-emitting elements L0 is determined by the main control chip 031 according to the ideal operating voltage corresponding to the operating current of each of the light-emitting elements L0 under the target grayscale and the wiring voltage drop on the wiring coupled to each of the light-emitting elements L0, and a feedback signal is transmitted to the voltage regulation sub-circuit by the main control chip 031 according to the target operating voltage of each of the light-emitting elements L0. Then, the magnitude of the power supply voltage output by the power supply circuit 01 is dynamically regulated by the voltage regulation sub-circuit 032 based on the received feedback signal. For detailed steps of regulating the power supply voltage, reference may be made to the device embodiments described above, which are not repeated herein.

Figure 10:
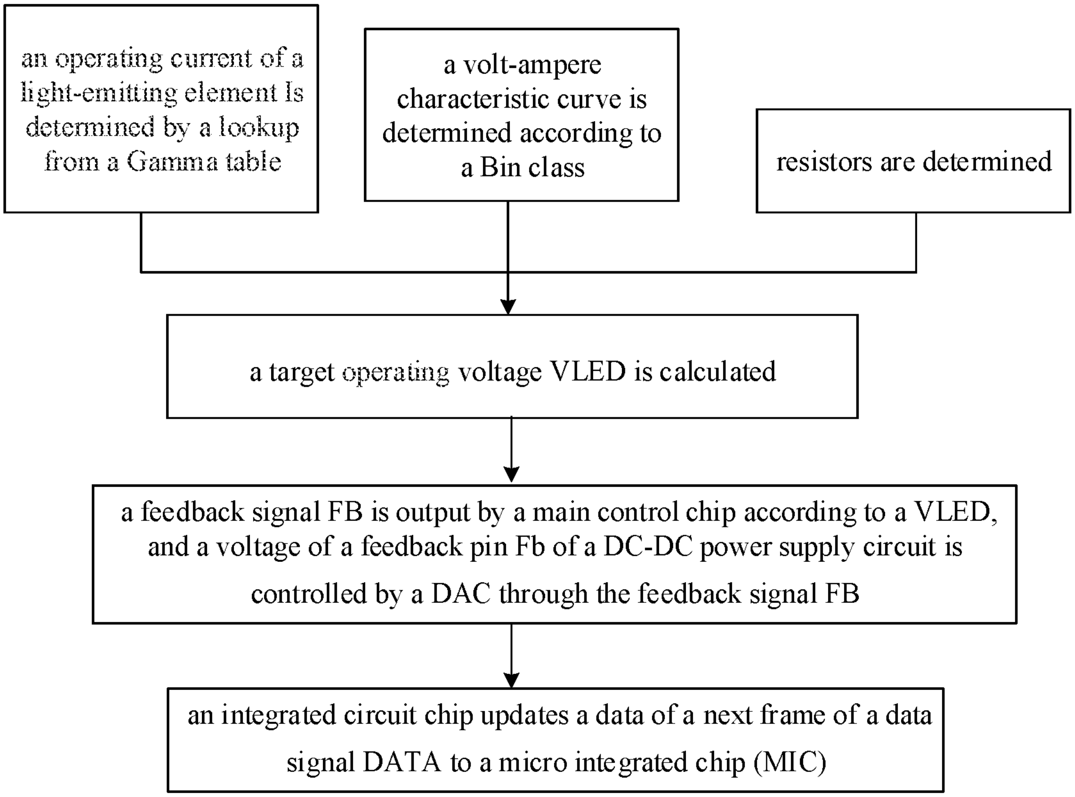
FIG. 10 is a flowchart of another method for driving a display panel according to some embodiments of the present disclosure.

In combination with the above embodiments and a flowchart of another method for driving a display panel shown in FIG. 10, in the embodiments of the present disclosure, first, the operating current of the light-emitting element L0 is determined by the main control chip 031 by a lookup from the Gamma table, the volt-ampere characteristic curve corresponding to the light-emitting element L0 is determined according to a Bin class, and a series of resistors are determined. Then, the target operating voltage VLED is calculated by the main control chip 031 according to the information above determined. Finally, the feedback signal FB is output by the main control chip 031 according to the calculated target operating voltage VLED, and a voltage of a feedback pin Fb of the power supply circuit (a DC-DC power supply circuit) is controlled by a digital analog converter DAC through the feedback signal FB. In this way, the magnitude of the power supply voltage output by the DC-DC power supply circuit is controlled. In addition, an integrated circuit chip updates a data of a next frame of a data signal DATA to a micro integrated chip (MIC), and the MIC drives, based on the data of the DATA, the light-emitting element L0 to emit light. In return, the display panel displays reliably.

In summary, the embodiments of the present disclosure provide a method for driving a display panel. In the method, the voltage regulation circuit regulates, based on the ideal operating voltage of the light-emitting element under a certain grayscale and the wiring voltage drop on the wiring coupled to the light-emitting element, the power supply voltage supplied by the power supply circuit. That is, the voltage regulation circuit flexibly regulates, based on the grayscale of the screen displayed by the display panel, the power supply voltage supplied by the power supply circuit to the light-emitting element. In this way, the operating power consumption of the display panel is effectively reduced, and the product yield is further improved.

Figure 11:
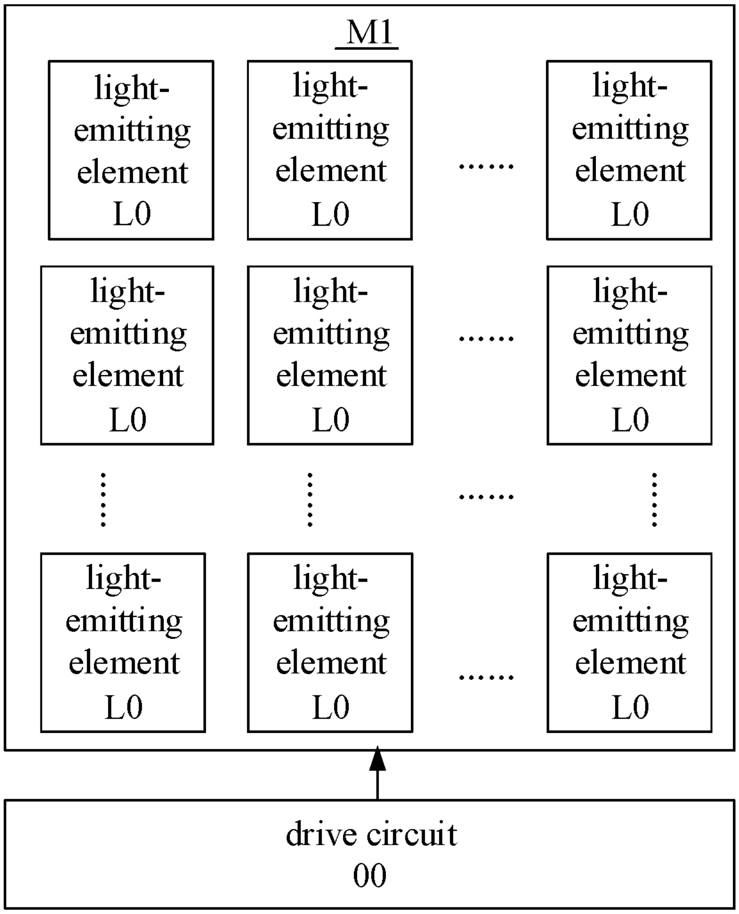
FIG. 11 is a schematic structural diagram of a display device according to some embodiments of the present disclosure.

FIG. 11 is a schematic structural diagram of a display device according to some embodiments of the present disclosure. Referring to FIG. 11, the display device includes: a display panel M1, and a drive circuit 00 as shown in the above figures, wherein the display panel M1 includes a plurality of light-emitting elements L0. The drive circuit 00 is coupled to the plurality of light-emitting elements L0 in the display panel M1 (not shown in FIG. 11), and is configured to transmit a power supply voltage to each of the light-emitting elements L0.

Optionally, the display device according to the embodiments of the present disclosure may be a Mini LED direct display device, an active-matrix organic light-emitting diode (AMOLED) display device, an OLED display device, a smart phone, a table computer, a television, a display, a notebook computer, a digital photo frame, a navigator, and any other products with display functions.

Described above are merely optional embodiments of the present disclosure, and are not intended to limit the present disclosure. Any modifications, equivalent substitutions, improvements, and the like may be made within the protection scope of the present disclosure, without departing from the spirit and principles of the present disclosure.

What is claimed is:

1. A drive circuit of a display panel, wherein the display panel comprises: a plurality of light-emitting elements, and the drive circuit comprises: a power supply circuit, an adapter circuit board, and a voltage regulation circuit; wherein the power supply circuit is coupled to the adapter circuit board, wherein the power supply circuit is configured to transmit a power supply voltage to the adapter circuit board;

the adapter circuit board is coupled to the plurality of light-emitting elements by wirings, wherein the adapter circuit board is configured to transmit the power supply voltage to each of the light-emitting elements; and the voltage regulation circuit is coupled to the power supply circuit, wherein the voltage regulation circuit is configured to regulate, according to an ideal operating voltage corresponding to an operating current of each of the light-emitting elements under a target grayscale and a wiring voltage drop on the wiring coupled to each of the light-emitting elements, a magnitude of the power supply voltage output by the power supply circuit, in the case that the display panel displays a picture of the target grayscale, wherein the voltage regulation circuit comprises: a main control chip and a voltage regulation sub-circuit; wherein the main control chip is coupled to the voltage regulation sub-circuit, and the main control chip is configured to determine a target operating voltage of each of the light-emitting elements according to the ideal operating voltage corresponding to the operating current of each of the light-emitting elements under the target grayscale and the wiring voltage drop on the wiring coupled to each of the light-emitting elements, and transmit a feedback signal to the voltage regulation sub-circuit according to the target operating voltage of each of the light-emitting elements; and the voltage regulation sub-circuit is coupled to the power supply circuit, and the voltage regulation sub-circuit is configured to regulate, according to the feedback signal, a magnitude of the power supply voltage output by the power supply circuit.

2. The drive circuit according to claim 1, wherein the feedback signal is a digital signal; and the voltage regulation sub-circuit comprises: a digital-to-analog converter and a voltage regulation module; wherein the digital-to-analog converter is coupled to the main control chip and the voltage regulation module, and the digital-to-analog converter is configured to convert the feedback signal to a voltage regulation signal, and transmit the voltage regulation signal to the voltage regulation module, the voltage regulation signal being an analog signal; and the voltage regulation module is coupled to the power supply circuit, and the voltage regulation module is configured to regulate, according to the voltage regulation signal, the magnitude of the power supply voltage output by the power supply circuit.

3. The drive circuit according to claim 2, wherein the power supply circuit is provided with a feedback pin and an output pin; and the voltage regulation module comprises: a first divider resistor, a second divider resistor, and a feedback resistor; wherein one terminal of the first divider resistor, one terminal of the second divider resistor, and one terminal of the feedback resistor are coupled to the feedback pin of the power supply circuit; and the other terminal of the first divider resistor is coupled to the output pin of the power supply circuit, the other terminal of the second divider resistor is grounded, and the other terminal of the feedback resistor is coupled to the digital-to-analog converter.

4. The drive circuit according to claim 3, wherein the power supply voltage V_L0 output by the power supply circuit satisfies: $V\_L0=(1+r10/r20+1/rfb)*Vfb-Vdac0/rfb$;

wherein r10 represents a resistance value of the first divider resistor, r20 represents a resistance value of the second divider resistor, rfb represents a resistance value of the feedback resistor, Vfb represents a voltage value of the feedback pin, and Vdac0 represents a voltage value of the voltage regulation signal.

5. The drive circuit according to claim 1, wherein the main control chip is configured to:

determine a sum of the ideal operating voltage corresponding to the operating current of each of the light-emitting elements under the target grayscale and the wiring voltage drop on the wiring coupled to each of the light-emitting elements as the target operating voltage of each of the light-emitting elements; and transmit the feedback signal to the voltage regulation sub-circuit according to a maximum target operating voltage in the determined target operating voltages.

6. The drive circuit according to claim 1, wherein the main control chip stores a volt-ampere characteristic curve corresponding to attribute information of each of the light-emitting elements, wherein the volt-ampere characteristic curve is configured to characterize, under the target grayscale, a mapping between the operating current of each of the light-emitting elements and the ideal operating voltage of each of the light-emitting elements; and the main control chip is further configured to:

acquire the attribute information of each of the light-emitting elements; and determine, according to the volt-ampere characteristic curve corresponding to the attribute information of each of the light-emitting elements and the operating current of each of the light-emitting elements under the target grayscale, the ideal operating voltage corresponding to the operating current of each of the light-emitting elements under the target grayscale.

7. The drive circuit according to claim 1, wherein the main control chip further stores a Gamma table, wherein the Gamma table is configured to characterize a mapping between a display grayscale and the operating current, the display grayscale being a grayscale of a picture displayed by the display panel; and the main control chip is further configured to determine the operating current of each of the light-emitting elements under the target grayscale by a lookup from the Gamma table.

8. The drive circuit according to claim 1, wherein the wirings comprise: a first signal wiring and a second signal wiring;

the adapter circuit board is coupled to a first electrode of each of the light-emitting elements in a bonding mode by the first signal wiring, and coupled to a second electrode of each of the light-emitting elements in the bonding mode by the second signal wiring;

wherein the adapter circuit board is configured to transmit the power supply voltage to each of the light-emitting elements by the first signal wiring, and transmit a pull-down power supply signal to each of the light-emitting elements by the second signal wiring; and the main control chip is further configured to determine a sum of a first voltage drop on the first signal wiring coupled to each of the light-emitting elements and a second voltage drop on the second signal wiring coupled to each of the light-emitting elements as the wiring voltage drop on the wiring coupled to each of the light-emitting elements.

9. The drive circuit according to claim 8, wherein the adapter circuit board comprises: a first circuit board and a second board that are connected to each other in the bonding mode, wherein the first circuit board is coupled to the power supply circuit, and the second circuit board is coupled to the plurality of light-emitting elements by the wirings; and the main control chip is further configured to:

determine a first wiring resistance of the first signal wiring coupled to each of the light-emitting elements, a second wiring resistance of the second signal wiring coupled to each of the light-emitting elements, a bonding resistance, and a third wiring resistance of the second circuit board;

determine, according to the first wiring resistance, the bonding resistance, and the third wiring resistance, the first voltage drop on the first signal wiring coupled to each of the light-emitting elements; and determine, according to the second wiring resistance, the bonding resistance, and the third wiring resistance, the second voltage drop on the second signal wiring coupled to each of the light-emitting elements.

10. The drive circuit according to claim 9, wherein the display panel comprises n rows and m columns of light-emitting elements; wherein for the light-emitting element disposed in $i^{th}$ row and $j^{th}$ column, the first voltage drop V_IRdrop_V_ij satisfies:

$$V\_IRdrop\_V\_ij=\Sigma_{i=1}{}^{n}I\_ij*(r\_PCB\_Bonding+r\_FPC+r\_Bonding+r\_Fanout)+\Sigma_{i}{}^{n}[\Sigma_{i=1}{}^{i}I\_ij*ri];\ \text{and}$$

for the light-emitting element disposed in the $i^{th}$ row and the $j^{th}$ column, the second voltage drop V_IRdrop_GND_ij satisfies:

$$V\_IRdrop\_GND\_ij=\Sigma_{i=1}{}^{n}I_{\_ij*}(r\_PCB\_Bonding'+r\_FPC'+r\_Bonding'+r\_Fanout')+\Sigma_{i}{}^{n}[\Sigma_{i=1}{}^{i}I\_ij*ri']:$$

wherein n, m, i, and j are integers greater than 0, i is less than or equal to n, j is less than or equal to m, $I_{\_ij}$ represents an operating current of the light-emitting elements disposed in the $i^{th}$ row and the $j^{th}$ column, r_PCB_Bonding represents a bonding resistance, on a bonding side of the first signal wiring, between the first circuit board and the second circuit board that are connected to each other in the bonding mode, r_PCB_Bonding' represents a bonding resistance, on a bonding side of the second signal wiring, between the first circuit board and the second circuit board that are connected to each other in the bonding mode, r_FPC represents a third wiring resistance in the second circuit board on the bonding side of the first signal wiring, r_FPC' represents a third wiring resistance in the second circuit board on the bonding side of the second signal wiring, r_Bonding represents a bonding resistance between the second circuit board and the first signal wiring that are connected to each other in the bonding mode, r_Bonding' represents a bonding resistance between the second circuit board and the second signal wiring that are connected to each other in the bonding mode, r_Fanout represents a fan-out resistance of a fan-out portion of the first signal wiring, r_Fanout' represents a fan-out resistance of a fan-out portion of the second signal wiring, ri represents the first wiring resistance of the first signal wiring, and ri' represents the second wiring resistance of the second signal wiring.

11. The drive circuit according to claim 1, wherein the main control chip is a microcontroller unit (MCU).

12. The drive circuit according to claim 1, wherein the power supply circuit is a direct-current to direct-current (DC-DC) power supply circuit.

13. The drive circuit according to claim 1, wherein the light-emitting element is a mini light-emitting diode (Mini LED).

14. A method for driving a display panel, applicable to a voltage regulation circuit in a drive circuit, wherein the drive circuit comprises: a power supply circuit, an adapter circuit board, and a voltage regulation circuit; wherein the power supply circuit is coupled to the adapter circuit board, wherein the power supply circuit is configured to transmit a power supply voltage to the adapter circuit board;

the adapter circuit board is coupled to the plurality of light-emitting elements by wirings, wherein the adapter circuit board is configured to transmit the power supply voltage to each of the light-emitting elements; and the voltage regulation circuit is coupled to the power supply circuit, wherein the voltage regulation circuit is configured to regulate, according to an ideal operating voltage corresponding to an operating current of each of the light-emitting elements under a target grayscale and a wiring voltage drop on the wiring coupled to each of the light-emitting elements, a magnitude of the power supply voltage output by the power supply circuit, in the case that the display panel displays a picture of the target grayscale; and the method comprises:

determining an ideal operating voltage of each of light-emitting elements according to the operating current of each of the light-emitting elements under the target grayscale, in the case that the display panel displays the picture of the target grayscale;

determining the wiring voltage drop on the wiring coupled to each of the light-emitting elements; and regulating, according to the ideal operating voltage of each of the light-emitting elements and the wiring voltage drop on the wiring coupled to each of the light-emitting elements, the magnitude of the power supply voltage output by the power supply circuit comprised in the drive circuit, wherein the voltage regulation circuit comprises: a main control chip and a voltage regulation sub-circuit; wherein the main control chip is coupled to the voltage regulation sub-circuit, and the main control chip is configured to determine a target operating voltage of each of the light-emitting elements according to the ideal operating voltage corresponding to the operating current of each of the light-emitting elements under the target gray-scale and the wiring voltage drop on the wiring coupled to each of the light-emitting elements, and transmit a feedback signal to the voltage regulation sub-circuit according to the target operating voltage of each of the light-emitting elements; and the voltage regulation sub-circuit is coupled to the power supply circuit, and the voltage regulation sub-circuit is configured to regulate, according to the feedback signal, a magnitude of the power supply voltage output by the power supply circuit.

15. A display device, comprising: a display panel and a drive circuit, wherein the display panel comprises a plurality of light-emitting elements;

wherein the drive circuit is coupled to the plurality of light-emitting elements in the display panel, and is configured to transmit a power supply voltage to each of the light-emitting elements; and the drive circuit comprises: a power supply circuit, an adapter circuit board, and a voltage regulation circuit; wherein the power supply circuit is coupled to the adapter circuit board, wherein the power supply circuit is configured to transmit a power supply voltage to the adapter circuit board;

the adapter circuit board is coupled to the plurality of light-emitting elements by wirings, wherein the adapter circuit board is configured to transmit the power supply voltage to each of the light-emitting elements; and the voltage regulation circuit is coupled to the power supply circuit, wherein the voltage regulation circuit is configured to regulate, according to an ideal operating voltage corresponding to an operating current of each of the light-emitting elements under a target grayscale and a wiring voltage drop on the wiring coupled to each of the light-emitting elements, a magnitude of the power supply voltage output by the power supply circuit, in the case that the display panel displays a picture of the target grayscale, wherein the voltage regulation circuit comprises: a main control chip and a voltage regulation sub-circuit; wherein the main control chip is coupled to the voltage regulation sub-circuit, and the main control chip is configured to determine a target operating voltage of each of the light-emitting elements according to the ideal operating voltage corresponding to the operating current of each of the light-emitting elements under the target gray-scale and the wiring voltage drop on the wiring coupled to each of the light-emitting elements, and transmit a feedback signal to the voltage regulation sub-circuit according to the target operating voltage of each of the light-emitting elements; and the voltage regulation sub-circuit is coupled to the power supply circuit, and the voltage regulation sub-circuit is configured to regulate, according to the feedback signal a magnitude of the power supply voltage output by the power supply circuit.

16. The display device according to claim 15, wherein the feedback signal is a digital signal; and the voltage regulation sub-circuit comprises: a digital-to-analog converter and a voltage regulation module; wherein the digital-to-analog converter is coupled to the main control chip and the voltage regulation module, and the digital-to-analog converter is configured to convert the feedback signal to a voltage regulation signal, and transmit the voltage regulation signal to the voltage regulation module, the voltage regulation signal being an analog signal; and the voltage regulation module is coupled to the power supply circuit, and the voltage regulation module is configured to regulate, according to the voltage regulation signal, the magnitude of the power supply voltage output by the power supply circuit.

17. The display device according to claim 16, wherein the power supply circuit is provided with a feedback pin and an output pin; and the voltage regulation module comprises: a first divider resistor, a second divider resistor, and a feedback resistor; wherein one terminal of the first divider resistor, one terminal of the second divider resistor, and one terminal of the feedback resistor are coupled to the feedback pin of the power supply circuit; and the other terminal of the first divider resistor is coupled to the output pin of the power supply circuit, the other terminal of the second divider resistor is grounded, and the other terminal of the feedback resistor is coupled to the digital-to-analog converter.

18. The display device according to claim 17, wherein the power supply voltage V_L0 output by the power supply circuit satisfies: $V\_L0=(1+r10/r20+1/rfb)*Vfb-Vdac0/rfb$;

wherein r10 represents a resistance value of the first divider resistor, r20 represents a resistance value of the second divider resistor, rfb represents a resistance value of the feedback resistor, Vfb represents a voltage value of the feedback pin, and Vdac0 represents a voltage value of the voltage regulation signal.

* * * * *